US012055875B2

(12) United States Patent
Oota

(10) Patent No.: US 12,055,875 B2
(45) Date of Patent: Aug. 6, 2024

(54) INTERMEDIATE TRANSFER MEDIUM, PRINTED MATERIAL, AND METHOD FOR PRODUCING PRINTED MATERIAL

(71) Applicant: Dai Nippon Printing Co., Ltd., Tokyo (JP)

(72) Inventor: Mitsuhiro Oota, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/756,569

(22) PCT Filed: Dec. 14, 2020

(86) PCT No.: PCT/JP2020/046502
§ 371 (c)(1),
(2) Date: May 27, 2022

(87) PCT Pub. No.: WO2021/117905
PCT Pub. Date: Jun. 17, 2021

(65) Prior Publication Data

US 2023/0004105 A1 Jan. 5, 2023

(30) Foreign Application Priority Data

Dec. 13, 2019 (JP) ................................ 2019-225889

(51) Int. Cl.
*G03G 15/16* (2006.01)

(52) U.S. Cl.
CPC ....... *G03G 15/162* (2013.01); *G03G 15/1605* (2013.01); *G03G 2215/1623* (2013.01)

(58) Field of Classification Search
CPC ............ G03G 15/1605; G03G 15/162; G03G 2215/1623
See application file for complete search history.

(56) References Cited

U.S. PATENT DOCUMENTS

| | | | | |
|---|---|---|---|---|
| 4,923,848 | A | 5/1990 | Akada et al. | |
| 7,133,059 | B2 | 11/2006 | Mochizuki et al. | |
| 2005/0084290 | A1* | 4/2005 | Baek .................. | G03G 21/1628 399/121 |
| 2017/0090353 | A1* | 3/2017 | Sakamoto ............ | G03G 15/162 |

(Continued)

FOREIGN PATENT DOCUMENTS

| | | | |
|---|---|---|---|
| JP | 2003-072150 | A | 3/2003 |
| JP | 2005-224970 | A | 8/2005 |
| JP | 2007-268969 | A | 10/2007 |

(Continued)

OTHER PUBLICATIONS

English translation of the International Preliminary Report on Patentability (Chapter I) dated Jun. 23, 2022 (Application No. PCT/JP2020/046502).

(Continued)

*Primary Examiner* — Joseph S Wong
(74) *Attorney, Agent, or Firm* — BURR PATENT LAW, PLLC

(57) ABSTRACT

An intermediate transfer medium according to the present disclosure includes a substrate and a transfer layer including at least a receiving layer, in which a logarithmic damping ratio ΔE determined by subjecting the receiving layer to rigid-body pendulum measurement at 70° C. is 0.10 or more.

11 Claims, 4 Drawing Sheets

(56) References Cited

U.S. PATENT DOCUMENTS

| | | | |
|---|---|---|---|
| 2019/0023048 A1 | 1/2019 | Yoda et al. | |

FOREIGN PATENT DOCUMENTS

| | | | |
|---|---|---|---|
| JP | 2011-126098 | A | 6/2011 |
| JP | 2012-051213 | A | 3/2012 |
| JP | 2015-212036 | A | 11/2015 |
| JP | 2018-058210 | A | 4/2018 |
| WO | 87/06195 | A1 | 10/1987 |
| WO | 2017/159870 | A1 | 9/2017 |

OTHER PUBLICATIONS

International Search Report and Written Opinion (Application No. PCT/JP2020/046502) dated Feb. 16, 2021 (with English translation).

Korean Office Action (with English translation) dated May 28, 2024 (Application No. 10-2022-7023793).

* cited by examiner

INTERMEDIATE TRANSFER MEDIUM, PRINTED MATERIAL, AND METHOD FOR PRODUCING PRINTED MATERIAL

TECHNICAL FIELD

The present disclosure relates to an intermediate transfer medium, a combination of the intermediate transfer medium and a thermal transfer sheet, a printed material, and a method for producing the printed material.

BACKGROUND ART

Hitherto, various thermal transfer recording methods have been known. For example, a method is known in which a thermal transfer sheet including a sublimation transfer-type coloring material layer containing a sublimation dye and a transfer-receiving article are superposed on each other, and then passed between a thermal head and a platen roller included in a thermal transfer printer while the thermal transfer sheet is heated by the thermal head to transfer the sublimation dye from the coloring material layer onto the transfer-receiving article to form an image, thereby producing a printed material.

A combination of such a thermal transfer sheet and an intermediate transfer medium provided with a transfer layer including at least a receiving layer is also widely used to produce printed materials (for example, see Patent Literature 1).

Specifically, first, a thermal transfer sheet and an intermediate transfer medium are superposed on each other and then passed between a thermal head and a platen roller included in a thermal transfer printer while the thermal transfer sheet is heated by the thermal head, thereby forming an image on a receiving layer included in the intermediate transfer medium. Subsequently, the intermediate transfer medium is heated to transfer the transfer layer onto a transfer-receiving article, thereby producing a printed material.

CITATION LIST

Patent Literature

PTL 1: Japanese Unexamined Patent Application Publication No. 2003-72150

SUMMARY OF INVENTION

Technical Problem

Hitherto, the transfer layer of the intermediate transfer medium has been transferred onto the transfer-receiving article at a high temperature of about 170° C. However, depending on the type of transfer-receiving article, warping may occur due to the heating during the transfer, thereby possibly impairing the appearance of the resulting printed material.

To suppress the occurrence of warpage in a transfer-receiving article, a transfer layer is transferred at a low temperature, or a resin material having a low thermal softening temperature is contained in a receiving layer included in the transfer layer. However, when the transfer layer is transferred at a low temperature, the transferability may deteriorate, and a desired printed material may not be obtained. When a resin material having a low thermal softening temperature is contained in the receiving layer, the receiving layer does not have sufficient releasability from a thermal transfer sheet including a sublimation transfer-type coloring material layer to possibly cause abnormal transfer.

It is an object of the present disclosure to provide an intermediate transfer medium including a transfer layer that can be transferred at a low temperature and has excellent releasability from a thermal transfer sheet including a sublimation transfer-type coloring material layer.

It is another object of the present disclosure to provide a combination of a thermal transfer sheet and the intermediate transfer medium.

It is another object of the present disclosure to provide a printed material and a method for producing the printed material.

Solution to Problem

An intermediate transfer medium according to the present disclosure is characterized by including a substrate and a transfer layer including at least a receiving layer, in which a logarithmic damping ratio $\Delta E$ determined by subjecting the receiving layer to rigid-body pendulum measurement at 70° C. is 0.10 or more.

A combination according to the present disclosure is characterized by including a thermal transfer sheet that includes a second substrate and a coloring material layer, and the intermediate transfer medium described above.

A printed material according to the present disclosure is characterized by being produced using the intermediate transfer medium described above and by including:

a transfer-receiving article; and the transfer layer provided with at least the receiving layer including an image that has been formed.

A method for producing a printed material according to the present disclosure is characterized by including the steps of:

providing the intermediate transfer medium described above;

forming an image on the receiving layer included in the intermediate transfer medium; and transferring the transfer layer provided with at least the receiving layer including the image that has been formed, from the intermediate transfer medium onto a transfer-receiving article.

Advantageous Effects of Invention

According to the present disclosure, it is possible to provide an intermediate transfer medium including a transfer layer that can be transferred at a low temperature and has excellent releasability from a thermal transfer sheet including a sublimation transfer-type coloring material layer.

According to the present disclosure, it is also possible to provide a combination of a thermal transfer sheet and the intermediate transfer medium described above.

Moreover, according to the present disclosure, it is possible to provide a printed material and a method for producing the printed material.

DESCRIPTION OF EMBODIMENTS (Intermediate Transfer Medium)

Figure 1:
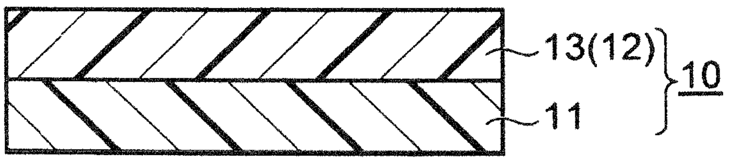
FIG. 1 is a schematic cross-sectional view of an embodiment of an intermediate transfer medium according to the present disclosure.

In an embodiment of the present disclosure, as illustrated in FIG. 1, an intermediate transfer medium 10 includes a substrate 11 and a transfer layer 12, and the transfer layer 12 includes at least a receiving layer 13.

Figure 2:
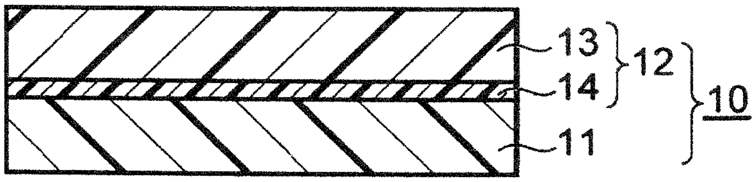
FIG. 2 is a schematic cross-sectional view of an embodiment of an intermediate transfer medium according to the present disclosure.

In an embodiment, as illustrated in FIG. 2, the transfer layer 12 included in the intermediate transfer medium 10 includes a peeling layer 14 below the receiving layer 13.

Figure 3:
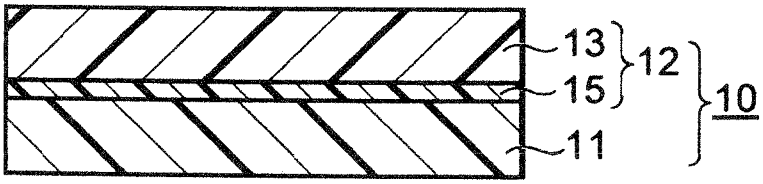
FIG. 3 is a schematic cross-sectional view of an embodiment of an intermediate transfer medium according to the present disclosure.
Figure 4:
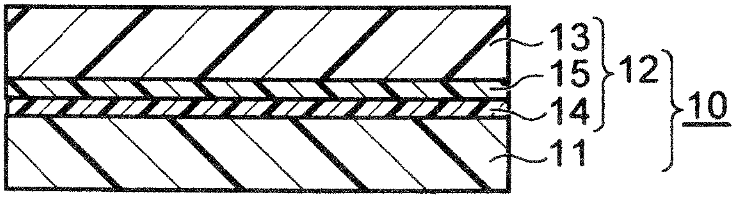
FIG. 4 is a schematic cross-sectional view of an embodiment of an intermediate transfer medium according to the present disclosure.

In an embodiment, as illustrated in FIG. 3, the transfer layer 12 included in the intermediate transfer medium 10 includes a protective layer 15 below the receiving layer 13. When the transfer layer 12 includes the peeling layer 14 and the protective layer 15, the protective layer 15 and the peeling layer 14 are disposed below the receiving layer 13 in this order, as illustrated in FIG. 4.

The logarithmic damping ratio ΔE of the receiving layer of the intermediate transfer medium in the rigid-body pendulum measurement at 70° C. is 0.10 or more, preferably 0.11 or more, more preferably 0.14 or more. Thereby, the intermediate transfer medium according to the present disclosure provides the effects described above. The upper limit of the logarithmic damping ratio ΔE is not limited to a particular value. The logarithmic damping ratio ΔE is, for example, 0.35 or less, preferably 0.25 or less.

In the present disclosure, the logarithmic damping ratio ΔE is measured as described below.

First, an intermediate transfer medium is cut into a size of 15 mm wide×50 mm long to provide a test sample 10.

Figure 5:
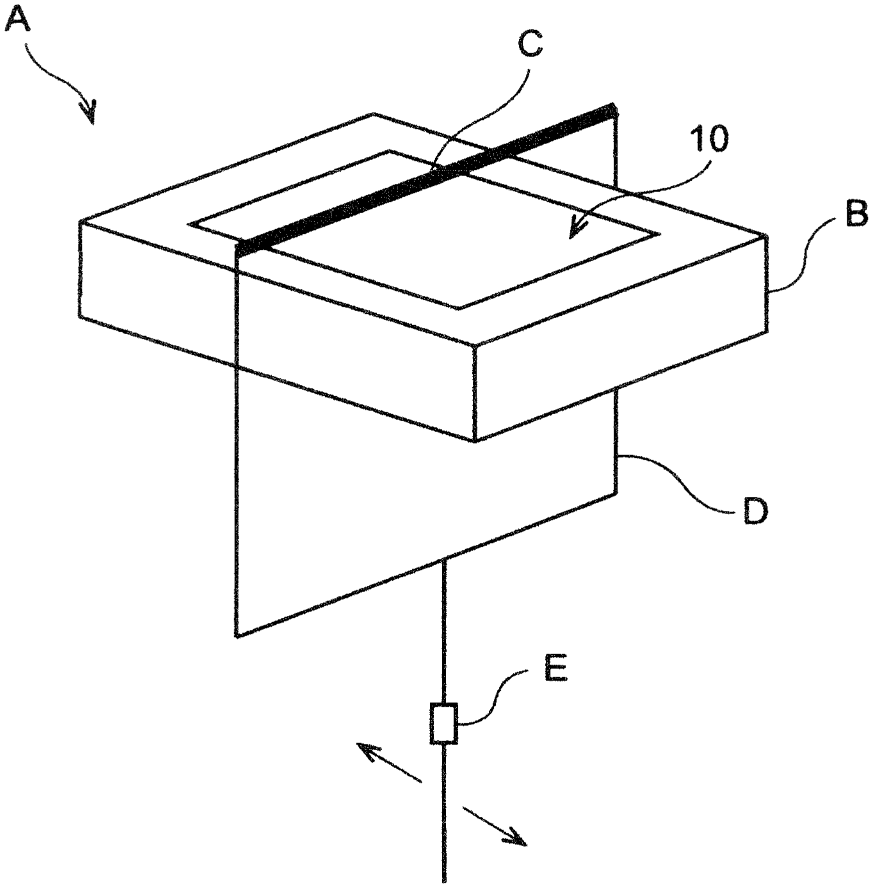
FIG. 5 is a schematic view of a rigid-body pendulum-type physical properties testing instrument.

A rigid-body pendulum-type physical properties testing instrument A including a test sample temperature control block B, a cylindrical cylinder C, a pendulum frame D, and an oscillation displacement sensor E is provided (see FIG. 5). Arrows in the figure are the swing directions of the pendulum frame D, and the swing directions are parallel to the length direction of the fixed test sample 10. The test sample 10 is fixed on the test sample temperature control block B with a Kapton tape at a place that does not affect the measurement results in such a manner that the receiving layer faces upward, and a temperature sensor is disposed on the test sample 10.

The test sample 10 is fixed in such a manner that its length direction is orthogonal to the direction of the central axis of the cylindrical cylinder C. The cylindrical cylinder C is disposed so as to be in contact with a surface of the receiving layer.

The test sample temperature control block B is heated from 25° C. to 130° C. at a rate of temperature increase of 3° C./min, and the logarithmic damping ratio ΔE of the receiving layer at this time is measured.

Specifically, the logarithmic damping ratio ΔE when the temperature of the receiving layer of the test sample 10 is 70° C. is used. A test sample measured once is no longer used. The measurement is performed three times using different test samples. The average value is used as a logarithmic damping ratio ΔE (ΔE=[In (A1/A2)+In (A2/A3)+ . . . In (An/An+1)]/n, where A: amplitude, n: wave number, initial amplitude A1: about 0.3 degrees), and In indicates a natural logarithm.

As the rigid-body pendulum-type physical properties testing instrument A, RPT-3000W available from A & D Company, Limited or a similar device can be used.

As the test sample temperature control block B, a CHB-100 cooling/heating block or a similar device can be used.

As the cylindrical cylinder C, an RBP-060 cylindrical cylinder edge or a similar device can be used.

As the pendulum frame D, FRB-100 or a similar device can be used.

CHB-100, RBP-060, and FRB-100 described above are devices or members included in RPT-3000W described above.

In the present disclosure, the minimum transferable temperature of the transfer layer included in the intermediate transfer medium is preferably 130° C. or lower, more preferably 125° C. or lower, even more preferably 120° C. or lower. Thereby, the transfer layer can be transferred from the intermediate transfer medium to the transfer-receiving article at a low temperature, thus suppressing the occurrence of warpage of the transfer-receiving article during the transfer. The lower limit of the minimum transferable temperature is not limited to a particular value, and the minimum transferable temperature is, for example, 80° C. or higher.

In the present disclosure, the minimum transferable temperature refers to the lowest temperature at which a transfer ratio (area ratio) is 95% when the transfer layer is transferred to the entire surface of a card substrate (85 mm×54 mm) formed of a poly(vinyl chloride). The transfer is performed at a transfer rate of 1.1 inches/second.

Each layer included in the intermediate transfer medium according to the present disclosure will be described below.

(Substrate)

An example of the substrate is a film formed of a resin (hereinafter, referred to simply as a "resin film"). Examples of the resin include polyesters, such as poly(ethylene terephthalate) (PET), polybutylene terephthalate (PBT), poly (ethylene naphthalate) (PEN), 1,4-poly(cyclohexylenedimethylene terephthalate), and terephthalic acid-cyclohexanedimethanol-ethylene glycol copolymers; polyamides, such as nylon 6 and nylon 6,6; polyolefins, such as polyethylene (PE), polypropylene (PP), and polymethylpentene; vinyl resins, such as poly(vinyl chloride), poly (vinyl alcohol) (PVA), poly(vinyl acetate), vinyl chloride-vinyl acetate copolymers, poly(vinyl butyral), and poly (vinyl pyrrolidone) (PVP); (meth)acrylic resins, such as poly(meth)acrylate and poly(methyl methacrylate); imide resins, such as polyimide and poly(ether imide); cellulose resins, such as cellophane, cellulose acetate, nitrocellulose, cellulose acetate propionate (CAP), and cellulose acetate butylate (CAB); styrene resins, such as polystyrene (PS); polycarbonate; and ionomer resins.

Among the above resins, polyesters, such as PET and PEN, are preferred, and PET is particularly preferred, from the viewpoint of heat resistance and mechanical strength.

The resin film can contain one or two or more of the above resins.

In the present disclosure, the term "(meth)acrylic" encompasses both "acrylic" and "methacrylic". The term "(meth) acrylate" encompasses both "acrylate" and "methacrylate".

A laminate including the resin film may be used as a substrate. The laminate of the resin film can be produced by, for example, a method, such as a dry lamination method, a wet lamination method, or an extrusion method.

When the substrate is a resin film, the resin film may be a stretched film or an unstretched film. The resin film is preferably uniaxially or biaxially stretched film from the viewpoint of strength.

The thickness of the substrate is preferably 1 μm or more and 50 μm or less, more preferably 6 μm or more and 25 μm or less. This results in good mechanical strength of the substrate and good heat energy transfer during the thermal transfer.

(Receiving Layer)

The transfer layer included in the intermediate transfer medium according to the present disclosure includes at least a receiving layer. The receiving layer is a layer disposed in the outermost surface of the transfer layer.

The receiving layer may be formed of a single layer consisting of one layer or may be formed of multiple layers consisting of two or more layers. In the case of multiple layers, the number of layers is preferably two or more layers and four or less layers, more preferably two or more layers and three or less layers, even more preferably two layers.

When the receiving layer is formed of multiple layers, the logarithmic damping ratio ΔE and the minimum transferable temperature tend to depend on the composition of the surface layer of the receiving layer, i.e., the outermost layer of the receiving layer. Thus, when the receiving layer is formed of multiple layers in an embodiment, the following description regarding the composition is preferably applied to the surface layer of the receiving layer.

In an embodiment, the receiving layer contains a resin material. Examples of the resin material include vinyl chloride-vinyl acetate copolymers, polyesters, polyolefins, vinyl resins, (meta)acrylic resins, imide resins, cellulose resins, styrene resins, and ionomer resins. The receiving layer can contain one or two or more resin materials.

In an embodiment, the receiving layer preferably contains a vinyl chloride-vinyl acetate copolymer. This enables an improvement in the sublimation-dye receptivity of the receiving layer, thereby improving the density of an image formed on the receiving layer. The receiving layer can contain one or two or more vinyl chloride-vinyl acetate copolymers.

In the present disclosure, the term "vinyl chloride-vinyl acetate copolymer" refers to a copolymer of vinyl chloride and vinyl acetate. The vinyl chloride-vinyl acetate copolymer may contain a constituent unit derived from a compound other than vinyl chloride or vinyl acetate as a copolymerization unit.

The percentage of the constituent unit derived from the compound other than vinyl chloride or vinyl acetate in the vinyl chloride-vinyl acetate copolymer is preferably 10% or less by mass, more preferably 5% or less by mass, even more preferably 3% or less by mass, based on the copolymer.

The vinyl chloride-vinyl acetate copolymer preferably has a number-average molecular weight (Mn) of 5,000 or more and 50,000 or less, more preferably 7,000 or more and 43,000 or less. This enables an improvement in the transferability of the transfer layer.

In the present disclosure, Mn refers to a value measured by gel permeation chromatography using polystyrene as a standard material, and is measured by a method in accordance with JIS K 7252-3 (published in 2016).

The vinyl chloride-vinyl acetate copolymer preferably has a glass transition temperature (Tg) of 50° C. or higher and 90° C. or lower, more preferably 60° C. or higher and 80° C. or lower. This enables an improvement in the transferability of the transfer layer.

In the present disclosure, Tg is a value determined by differential scanning calorimetry (DSC) under the condition of a heating rate of 10° C./min in accordance with JIS K 7121.

In an embodiment, the vinyl chloride-vinyl acetate copolymer content is preferably 20% or more by mass and 95% or less by mass, more preferably 50% or more by mass and 80% or less by mass, even more preferably 62% or more by mass and 80% or less by mass, based on the total amount of the resin material contained in the receiving layer. This enables improvements in the sublimation-dye receptivity of the receiving layer, the density of an image formed on the receiving layer, and the transferability of the transfer layer. When the receiving layer is formed of multiple layers, the logarithmic damping ratio ΔE and the minimum transferable temperature tend to depend on the composition of the surface layer of the receiving layer. Thus, the surface layer of the receiving layer preferably satisfies the requirement for the vinyl chloride-vinyl acetate copolymer content described above.

In an embodiment, the receiving layer preferably contains a crystalline polyester. This can effectively reduce the minimum transferable temperature of the transfer layer while maintaining the releasability between the receiving layer and the thermal transfer sheet including the sublimation transfer-type coloring material layer. The receiving layer can contain one or two or more crystalline polyesters.

In the present disclosure, the term "crystalline polyester" refers to a polyester exhibiting a clear melting peak in either of two temperature increase steps in a process in which the temperature is increased from −100° C. to 300° C. at 20° C./min, then decreased from 300° C. to −100° C. at 50° C./min, and subsequently increased from −100° C. to 300° C. at 20° C./min using a differential scanning calorimeter.

In an embodiment, the receiving layer preferably contains an amorphous polyester. This enables an improvement in the releasability between the receiving layer and the thermal transfer sheet including a sublimation transfer-type coloring material layer and an effective reduction in the minimum transferable temperature of the transfer layer. The receiving layer can contain one or two or more amorphous polyesters.

In the present disclosure, the term "amorphous polyester" refers to a polyester that does not exhibit a clear melting peak in any of the two temperature increase steps using a differential scanning calorimeter.

As the polyester, a copolymer of a dicarboxylic acid compound and a diol compound is preferred.

Examples of the dicarboxylic acid compound include malonic acid, succinic acid, glutaric acid, adipic acid, suberic acid, sebacic acid, dodecanedioic acid, eicosanedioic acid, pimelic acid, azelaic acid, methylmalonic acid, ethylmalonic acid, adamantanedicarboxylic acid, norbornenedicarboxylic acid, cyclohexanedicarboxylic acid, decalindicarboxylic acid, terephthalic acid, isophthalic acid, phthalic acid, 1,4-naphthalenedicarboxylic acid, 1,5-naphthalenedicarboxylic acid, 2,6-naphthalenedicarboxylic acid, 1,8-naphthalenedicarboxylic acid, 4,4'-diphenyldicarboxylic acid, 4,4'-diphenyl ether dicarboxylic acid, sodium 5-sulfoisophthalate, phenylendandicarboxylic acid, anthracenedicarboxylic acid, phenanthrenedicarboxylic acid, 9,9'-bis(4-carboxyphenyl)fluorene acid, and ester derivatives thereof. One or two or more dicarboxylic acid compounds can be used.

Examples of the diol compound include ethylene glycol, 1,2-propanediol, 1,3-propanediol, butanediol, 2-methyl-1,3-propanediol, hexanediol, neopentylglycol, cyclohexanedimethanol, cyclohexanediethanol, decahydronaphthalenedimethanol, decahydronaphthalenediethanol, norbornanedimethanol, norbornanediethanol, tricyclodecanedimethanol, tricyclodecaneethanol, tetracyclododecanedimethanol, tetracyclododecanediethanol, decalindimethanol, decalindiethanol, 5-methylol-5-ethyl-2-(1,1-dimethyl-2-hydroxyethyl)-1,3-dioxane, cyclohexanediol, bicyclohexyl-4,4'-diol, 2,2-bis(4-hydroxycyclohexyl)propane, 2,2-bis(4-(2-hydroxyethoxy)cyclohexyl)propane, cyclopentanediol, 3-methyl-1,2-cyclopentadiol, 4-cyclopentene-1,3-diol, adamandiol, p-xylylene glycol, bisphenol A, bisphenol S, styrene glycol, trimethyloipropane, and pentaerythritol. One or two or more diol compounds can be used.

The polyester may contain a constituent unit derived from a polymerizable component other than the dicarboxylic acid compounds or the diol compounds. The percentage of the constituent unit derived from the polymerizable component is preferably 10% or less by mass, more preferably 5% or less by mass, even more preferably 3% or less by mass, based on the polyester.

The Mn of the crystalline polyester is preferably 10,000 or more and 50,000 or less, more preferably 20,000 or more and 40,000 or less. This enables a further improvement in the releasability between the receiving layer and the thermal transfer sheet including the sublimation transfer-type coloring material layer and enables the transfer of the transfer layer at a lower temperature.

The Mn of the amorphous polyester is preferably 11,000 or more and 50,000 or less, more preferably 13,000 or more and 40,000 or less. This enables a further improvement in the releasability between the receiving layer and the thermal transfer sheet including the sublimation transfer-type coloring material layer and enables the transfer of the transfer layer at a lower temperature.

The Tg of the crystalline polyester is preferably −50° C. or higher and 50° C. or lower, more preferably −30° C. or higher and 30° C. or lower. This enables a further improvement in the releasability between the receiving layer and the thermal transfer sheet including the sublimation transfer-type coloring material layer and enables the transfer of the transfer layer at a lower temperature.

The Tg of the amorphous polyester is preferably 30° C. or higher and 80° C. or lower, more preferably 40° C. or higher and 75° C. or lower. This enables a further improvement in the releasability between the receiving layer and the thermal transfer sheet including the sublimation transfer-type coloring material layer and enables the transfer of the transfer layer at a lower temperature.

The melting point of the crystalline polyester is preferably 50° C. or higher and 150° C. or lower, more preferably 80° C. or higher and 120° C. or lower. This enables a further improvement in the releasability between the receiving layer and the thermal transfer sheet including the sublimation transfer-type coloring material layer and enables the transfer of the transfer layer at a lower temperature.

In the present disclosure, the melting point is a value determined by DSC under the condition of a heating rate of 20° C./min in accordance with HS K 7121 (published in 2012).

In an embodiment, the crystalline polyester content is preferably 5% or more by mass and 80% or less by mass, more preferably 20% or more by mass and 50% or less by mass, even more preferably 20% or more by mass and 38% or less by mass, based on the total amount of the resin material contained in the receiving layer. This enables the transfer of the transfer layer at a lower temperature while maintaining the releasability between the receiving layer and the thermal transfer sheet including the sublimation transfer-type coloring material layer. When the receiving layer is formed of multiple layers, the logarithmic damping ratio ΔE and the minimum transferable temperature tend to depend on the composition of the surface layer of the receiving layer. Thus, the surface layer of the receiving layer preferably satisfies the requirement for the crystalline polyester content described above.

When the crystalline polyester is used, the receiving layer preferably contains the vinyl chloride-vinyl acetate copolymer and the crystalline polyester.

In this case, the ratio of the vinyl chloride-vinyl acetate copolymer content to the crystalline polyester content (vinyl chloride-vinyl acetate copolymer content/crystalline polyester content) is preferably 1/4 or more and 19/1 or less, more preferably 1/1 or more and 4/1 or less. For example, a higher crystalline polyester content results in a higher logarithmic damping ratio ΔE. This enables an improvement in the releasability between the receiving layer and the thermal transfer sheet including the sublimation transfer-type coloring material layer and enables the transfer of the transfer layer at a lower temperature while maintaining the sublimation-dye receptivity of the receiving layer. When the receiving layer is formed of multiple layers, the logarithmic damping ratio ΔE and the minimum transferable temperature tend to depend on the composition of the surface layer of the receiving layer. Thus, the surface layer of the receiving layer preferably satisfies the ratio requirement described above.

In an embodiment, the amorphous polyester content is preferably 80% or more by mass and 100% or less by mass, more preferably 85% or more by mass and 100% or less by mass, even more preferably 90% or more by mass and 100% or less by mass, based on the total amount of the resin material contained in the receiving layer. For example, a higher amorphous polyester content results in a higher logarithmic damping ratio ΔE. This enables a further improvement in the releasability between the receiving layer and the thermal transfer sheet including the sublimation transfer-type coloring material layer and enables the transfer of the transfer layer at a lower temperature. When the receiving layer is formed of multiple layers, the logarithmic damping ratio ΔE and the minimum transferable temperature tend to depend on the composition of the surface layer of the receiving layer. Thus, the surface layer of the receiving layer preferably satisfies the requirement for the amorphous polyester content described above.

The receiving layer may contain an additional resin material other than the vinyl chloride-vinyl acetate copolymer or the polyester. Examples of the additional resin material include polyolefins, vinyl resins, (meth)acrylic resins, imide resins, cellulose resins, styrene resins, and ionomer resins. The receiving layer can contain one or two or more additional resin materials.

The receiving layer preferably has a resin material content of 80% or more by mass and 99.5% or less by mass, more preferably 85% or more by mass and 99% or less by mass. This enables a further improvement in the sublimation-dye receptivity.

The receiving layer preferably contains a release material. This enables an improvement in the releasability between the receiving layer and the thermal transfer sheet including the sublimation transfer-type coloring material layer.

Examples of the release material include fluorine compounds, phosphate compounds, silicone oils, higher fatty acid amide compounds, metallic soap, and waxes, such as polyethylene wax and paraffin wax. Among these, silicone oils are preferred from the viewpoint of the releasability described above.

The receiving layer can contain two or more release materials.

Examples of silicone oils include straight silicone oils, such as dimethyl silicone oils and methylphenyl silicone oils; and modified silicone oils, such as amino-modified silicone oils, epoxy-modified silicone oils, carboxy-modified silicone oils, (meth)acryl-modified silicone oils, mercapto-modified silicone oils, carbinol-modified silicone oils, fluorine-modified silicone oils, methylstyryl-modified silicone oils, and polyether-modified silicone oils. Modified silicone oils include single-terminal type, both-terminal type, and side-chain single-terminal type modified silicone oils.

Among these, modified silicone oils are preferred, and epoxy-modified silicone oils are particularly preferred, from the viewpoint of the releasability described above.

The release material content is preferably 0.1 parts or more by mass and 20 parts or less by mass, more preferably 0.5 parts or more by mass and 10 parts or less by mass, based on 100 parts by mass of the total amount of the resin material contained in the receiving layer. This enables a further improvement in releasability.

The receiving layer can contain additives, such as fillers, plasticizers, ultraviolet absorbers, inorganic particle, organic particles, and dispersants. For example, when the receiving layer contains particles formed of, for example, silica, the receiving layer has further improved blocking resistance and releasability. The receiving layer can contain one or two or more additives.

The inorganic particles and the organic particles preferably have an average particle size of 0.5 μm or more and 10 μm or less, more preferably 1 μm or more and 8 μm or less. In the present disclosure, the terms "average particle size" refers to a number-average particle size measured with a laser diffraction particle size distribution analyzer (available from Shimadzu Corporation, SALD-2000J) or an equivalent device.

The additive content is preferably 0.1 parts or more by mass and 20 parts or less by mass, more preferably 0.5 parts or more by mass and 10 parts or less by mass, based on 100 parts by mass of the total amount of the resin material contained in the receiving layer.

The receiving layer preferably has a thickness of 0.5 μm or more and 20 μm or less, more preferably 1 μm or more and 10 μm or less. This enables improvements in the density of an image formed on the receiving layer and the transferability of the transfer layer.

In an embodiment, the receiving layer can be formed by dispersing or dissolving the above material in water or an appropriate organic solvent to prepare a coating liquid, applying the coating liquid to a freely-selected layer, such as the substrate, by a known means to form a coating film, and then drying the film. Examples of the known means include a roll coating method, a reverse roll coating method, a gravure coating method, a reverse gravure coating method, a bar coating method, and a rod coating method.

(Peeling Layer)

In an embodiment, the transfer layer included in the intermediate transfer medium includes a peeling layer. The peeling layer is a layer that is to be transferred from the intermediate transfer medium to the transfer-receiving article, and is a layer that is to be located in the outermost surface of the printed material.

In an embodiment, the peeling layer contains a resin material. Examples of the resin material include polyesters, polyamides, polyolefins, vinyl resins, (meth)acrylic resins, imide resins, cellulose resins, styrene resins, polycarbonates, and ionomer resins. The peeling layer can contain one or two or more resin materials.

The peeling layer can contain at least one selected from the release materials and the additives described above.

The peeling layer preferably has a thickness of 0.1 μm or more and 5 μm or less, more preferably 0.3 μm or more and 4 μm or less. This enables a further improvement in the durability of the peeling layer.

In an embodiment, the peeling layer can be formed by dispersing or dissolving the above material in water or an appropriate organic solvent to prepare a coating liquid, applying the coating liquid onto the substrate by the known means to form a coating film, and then drying the film.

(Protective Layer)

In an embodiment, the transfer layer included in the intermediate transfer medium includes a protective layer below the receiving layer or between the peeling layer and the receiving layer.

In an embodiment, the protective layer contains a resin material. Examples of the resin material include polyesters, (meta)acrylic resins, epoxy resins, styrene resins, (meta) acrylic polyol resins, polyurethanes, ionizing radiation-curable resins, and ultraviolet-absorbing resin. The protective layer can contain one or two or more resin materials.

The protective layer can contain one or two or more of the additives described above.

The protective layer preferably has a thickness of 0.5 μm or more and 7 μm or less, more preferably 1 μm or more and 5 μm or less. This enables a further improvement in the durability of the protective layer.

In an embodiment, the protective layer can be formed by dispersing or dissolving the above material in water or an appropriate organic solvent to prepare a coating liquid, applying the coating liquid to, for example, the substrate by the known means to form a coating film, and then drying the film.

(Combination of Thermal Transfer Sheet and Intermediate Transfer Medium)

A combination according to the present disclosure includes a thermal transfer sheet including a second substrate and a coloring material layer, and the intermediate transfer medium described above.

Figure 6:
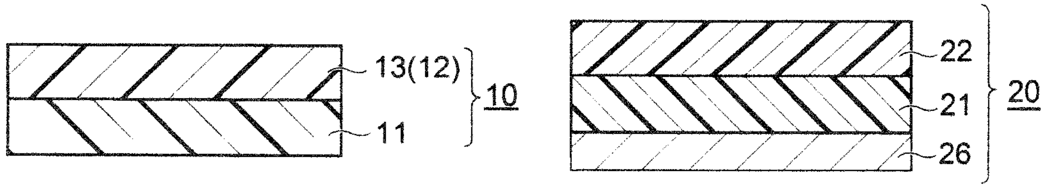
FIG. 6 is a schematic cross-sectional view of an embodiment of a combination of a thermal transfer sheet and an intermediate transfer medium according to the present disclosure.

In an embodiment, as illustrated in FIG. 6, the combination of the thermal transfer sheet 20 and the intermediate transfer medium 10 according to the present disclosure includes the intermediate transfer medium 10 described above and the thermal transfer sheet 20 including a second substrate 21 and a sublimation transfer-type coloring material layer 22 disposed on the second substrate 21.

Figure 7:
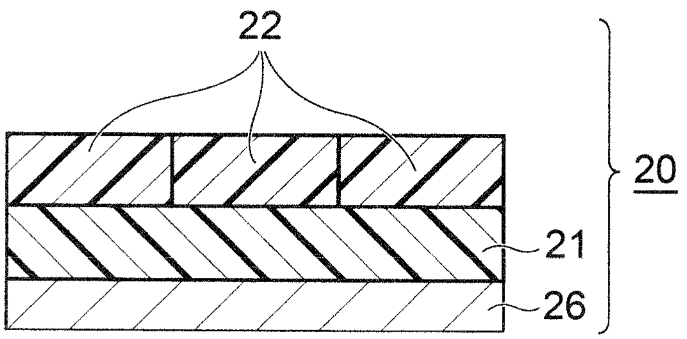
FIG. 7 is a schematic cross-sectional view of an embodiment of a thermal transfer sheet included in a combination of the thermal transfer sheet and an intermediate transfer medium according to the present disclosure.

As illustrated in FIG. 7, the thermal transfer sheet 20 may include multiple sublimation transfer-type coloring material layers 22 that are disposed as being frame sequentially on the same surface of the substrate.

Figure 8:
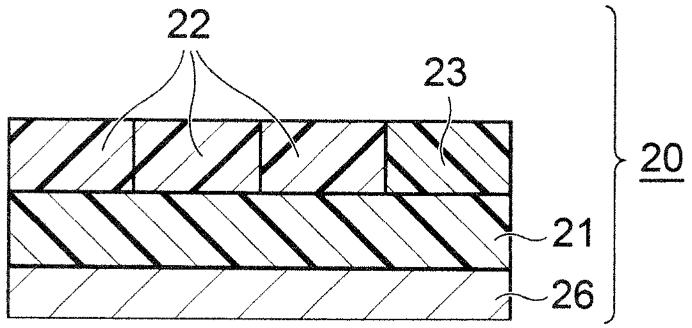
FIG. 8 is a schematic cross-sectional view of an embodiment of a thermal transfer sheet included in a combination of the thermal transfer sheet and an intermediate transfer medium according to the present disclosure.

In an embodiment, as illustrated in FIG. 8, the thermal transfer sheet 20 may include a melt transfer-type coloring material layer 23 in such a manner that the melt transfer-type coloring material layer 23 and the sublimation transfer-type coloring material layer 22 are disposed as being frame sequentially on the same surface of the substrate.

Figure 9:
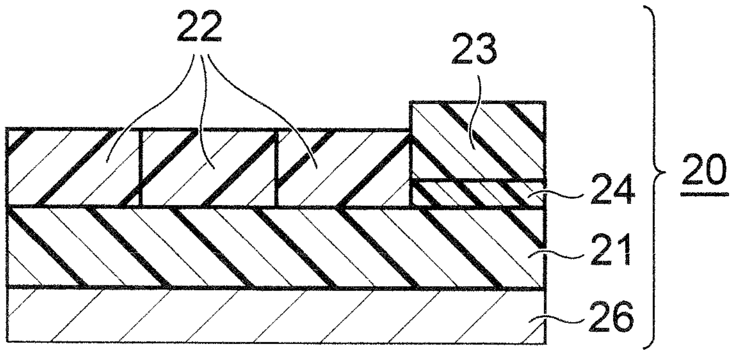
FIG. 9 is a schematic cross-sectional view of an embodiment of a thermal transfer sheet included in a combination of the thermal transfer sheet and an intermediate transfer medium according to the present disclosure.

In an embodiment, as illustrated in FIG. 9, the thermal transfer sheet 20 may include a peeling layer 24 disposed between the second substrate 21 and the melt transfer-type coloring material layer 23.

Figure 10:
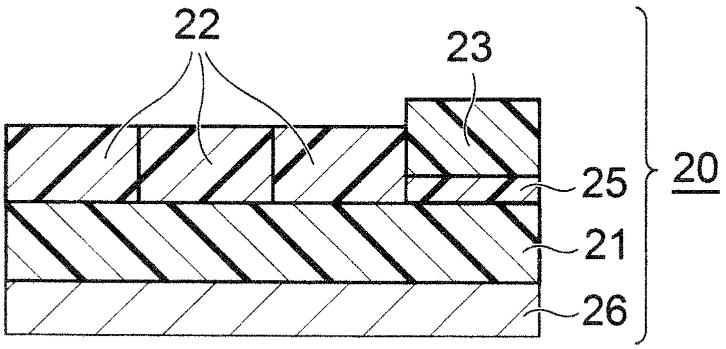
FIG. 10 is a schematic cross-sectional view of an embodiment of a thermal transfer sheet included in a combination of the thermal transfer sheet and an intermediate transfer medium according to the present disclosure.
Figure 11:
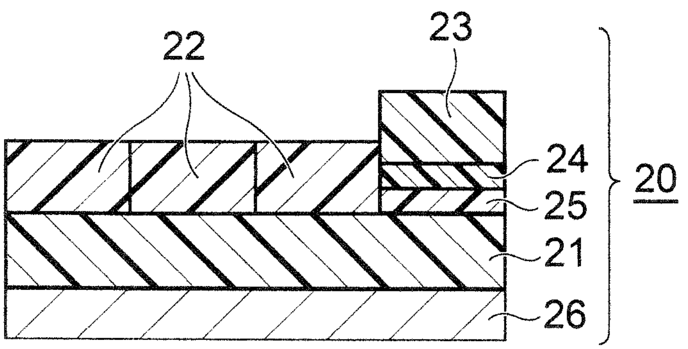
FIG. 11 is a schematic cross-sectional view of an embodiment of a thermal transfer sheet included in a combination of the thermal transfer sheet and an intermediate transfer medium according to the present disclosure.

In an embodiment, as illustrated in FIG. 10, the thermal transfer sheet 20 may include a release layer 25 disposed between the second substrate 21 and the melt transfer-type coloring material layer 23. When the thermal transfer sheet 20 includes the peeling layer 24 and the release layer 25, the release layer 25 and the peeling layer 24 are disposed, in that order, between the second substrate 21 and the melt transfer-type coloring material layer 23, as illustrated in FIG. 11.

In an embodiment, as illustrated in each of FIGS. 6 to 11, the thermal transfer sheet 20 includes a back layer 26 on a surface of the second substrate 21 opposite that on which the sublimation transfer-type coloring material layer 22 is provided.

Each layer included in the thermal transfer sheet will be described below. The intermediate transfer medium has been described above; thus, the description thereof is omitted here.

(Second Substrate)

An example of the second substrate is a resin film. As a resin contained in the resin film, a resin that can be used for the substrate included in the intermediate transfer medium described above can be appropriately selected and used. In the present disclosure, the substrate included in the thermal transfer sheet is described as the "second substrate" to distinguish the substrate included in the intermediate transfer medium from the substrate included in the thermal transfer sheet.

The second substrate preferably has a thickness of 2 μm or more and 25 μm or less, more preferably 3 μm or more and 10 μm or less. This results in good mechanical strength of the second substrate and good heat energy transfer during the thermal transfer.

(Sublimation Transfer-Type Coloring Material Layer)

The sublimation transfer-type coloring material layer contains a sublimation dye. Examples of the sublimation dye include diarylmethane dyes, triarylmethane dyes, thiazole dyes, merocyanine dyes, pyrazolone dyes, methine dyes, indoaniline dyes, acetophenone azomethine dyes, pyrazolo azomethine dyes, xanthene dyes, oxazine dyes, thiazine dyes, azine dyes, acridine dyes, azo dyes, spiropyran dyes, indolinospiropyran dyes, fluoran dyes, naphthoquinone dyes, anthraquinone dyes, and quinophthalone dyes. The sublimation transfer-type coloring material layer can contain one or two or more sublimation dyes.

The sublimation transfer-type coloring material layer preferably has a sublimation dye content of 5% or more by mass and 80% or less by mass, more preferably 10% or more by mass and 70% or less by mass. This enables an improvement in the density of an image formed on the receiving layer.

In an embodiment, the sublimation transfer-type coloring material layer contains a resin material. Examples of the resin material include (meth)acrylic resins, polyurethanes, acetal resins, polyamides, polyesters, melamine resins, polyol resins, cellulose resins, and silicone resins. The sublimation transfer-type coloring material layer can contain one or two or more resin materials.

The sublimation transfer-type coloring material layer preferably has a resin material content of 20% or more by mass and 75% or less by mass, more preferably 30% or more by mass and 60% or less by mass.

In an embodiment, the sublimation transfer-type coloring material layer contains the release material described above. The sublimation transfer-type coloring material layer can contain one or two or more of the release materials described above. This enables an improvement in the releasability between the sublimation transfer-type coloring material layer and the receiving layer included in the intermediate transfer medium.

The sublimation transfer-type coloring material layer preferably has a release material content of 0.01% or more by mass and 3% or less by mass, more preferably 0.01% or more by mass and 1% or less by mass, even more preferably 0.05% or more by mass and 0.5% or less by mass. This enables a further improvement in releasability.

The sublimation transfer-type coloring material layer can contain one or two or more of the additives described above.

The sublimation transfer-type coloring material layer preferably has a thickness of 0.1 μm or more and 5 μm or less, more preferably 0.3 μm or more and 2 μm or less.

In an embodiment, the sublimation transfer-type coloring material layer can be formed by dispersing or dissolving the above material in water or an appropriate organic solvent to prepare a coating liquid, applying the coating liquid onto the second substrate, by the known means to form a coating film, and then drying the film.

(Melt Transfer-Type Coloring Material Layer)

The melt transfer-type coloring material layer contains a coloring material.

The coloring material may be a pigment or a dye.

Examples of the coloring material include carbon black, acetylene black, lamp black, black smoke, iron black, aniline black, silica, calcium carbonate, titanium oxide, cadmium red, cadmopone red, chromium red, vermilion, colcothar, azo-based pigments, alizarin lake, quinacridone, cochineal lake perylene, yellow ocher, aureolin, cadmium yellow, cadmium orange, chromium yellow, zinc yellow, naples yellow, nickel yellow, azo-based pigments, greenish yellow, ultramarine, blue verditer, cobalt, phthalocyanine, anthraquinone, indigoid, cinnabar green, cadmium green, chromium green, phthalocyanine, azomethine, perylene, and aluminum pigments.

The melt transfer-type coloring material layer can contain one or two or more coloring materials.

The melt transfer-type coloring material layer preferably has a coloring material content of 10% or more by mass and 60% or less by mass, more preferably 20% or more by mass and 50% or less by mass. This enables an improvement in the density of an image formed on the receiving layer and the suppression of unintentional peeling of the melt transfer-type coloring material layer from the second substrate.

In an embodiment, the melt transfer-type coloring material layer contains a resin material.

Examples of the resin material include polyesters, polyamides, polyolefins, vinyl resins, vinyl acetal resins, (meta) acrylic resins, cellulose resins, styrene resins, polycarbonates, butyral resins, phenoxy resins, and ionomer resins.

Among these resin materials, vinyl resins are preferred, and a vinyl chloride-vinyl acetate copolymer is particularly preferred, from the viewpoint of adhesion between the melt transfer-type coloring material layer and the receiving layer.

The melt transfer-type coloring material layer can contain one or two or more resin materials.

The melt transfer-type coloring material layer preferably has a resin material content of 20% or more by mass and 75% or less by mass, more preferably 30% or more by mass and 60% or less by mass.

The melt transfer-type coloring material layer can contain the additives described above.

The melt transfer-type coloring material layer preferably has a thickness of 0.1 μm or more and 5 μm or less, more preferably 0.5 μm or more and 2 μm or less. This enables an improvement in the adhesion between the melt transfer-type coloring material layer and the receiving layer.

In an embodiment, the melt transfer-type coloring material layer can be formed by dispersing or dissolving the above material in water or an appropriate organic solvent to prepare a coating liquid, applying the coating liquid onto the second substrate, by the known means to form a coating film, and then drying the film.

(Peeling Layer)

When the coloring material layer is the melt transfer-type coloring material layer, the peeling layer can be disposed between the second substrate and the melt transfer-type coloring material layer. The peeling layer is transferred together with the coloring material layer when transfer is performed onto the receiving layer included in the intermediate transfer medium.

In an embodiment, the peeling layer contains a resin material. Examples of the resin material include polyesters, polyamides, polyolefins, vinyl resins, (meth)acrylic resins, imide resins, cellulose resins, styrene resins, polycarbonates, and ionomer resins. The peeling layer can contain one or two or more resin materials.

The peeling layer has a resin material content of, for example, 50% or more by mass and 99% or less by mass.

The peeling layer can contain the additives described above.

The peeling layer preferably has a thickness of 0.1 μm or more and 3 μm or less, more preferably 0.3 μm or more and 1.5 μm or less. This enables a further improvement in the transferability of the coloring material layer.

In an embodiment, the peeling layer can be formed by dispersing or dissolving the above material in water or an appropriate organic solvent to prepare a coating liquid, applying the coating liquid to, for example, the second substrate by the known means to form a coating film, and then drying the film.

(Release Layer)

The release layer can be disposed between the second substrate and the melt transfer-type coloring material layer when the coloring material layer is the melt transfer-type coloring material layer. The release layer remains on the second substrate during the transfer of the coloring material layer onto the receiving layer included in the intermediate transfer medium.

In an embodiment, the release layer contains a resin material. Examples of the resin material include (meth) acrylic resins, polyurethanes, acetal resins, polyamides, polyesters, melamine resins, polyol resins, cellulose resins, and silicone resins. The release layer can contain one or two or more resin materials.

The release layer has a resin material content of, for example, 50% or more by mass and 99% or less by mass.

In an embodiment, the release layer contains the release material described above. This enables a further improvement in the transferability of the melt transfer-type coloring material layer.

The release layer preferably has a release material content of 0.1% or more by mass and 10% or less by mass, more preferably 0.5% or more by mass and 5% or less by mass. This enables a further improvement in the transferability of the melt transfer-type coloring material layer.

The release layer can contain the additives described above.

The release layer has a thickness of, for example, 0.1 μm or more and 2.0 μm or less.

In an embodiment, the release layer can be formed by dispersing or dissolving the above material in water or an appropriate organic solvent to prepare a coating liquid, applying the coating liquid onto the second substrate, by the known means to form a coating film, and then drying the film.

(Back Layer)

In an embodiment, the thermal transfer sheet includes a back layer on a surface of the second substrate opposite that on which the coloring material layer and so forth are provided. This can suppress the occurrence of sticking and wrinkling caused by heating during the thermal transfer.

In an embodiment, the back layer contains a resin material. Examples of the resin material include vinyl resins, polyesters, polyamides, polyolefins, (meth)acrylic resins, polyolefins, polyurethanes, cellulose resins, and phenolic resins. The back layer can contain one or two or more resin materials.

In an embodiment, the back layer contains an isocyanate compound. Examples of the isocyanate compound include xylene diisocyanate, toluene diisocyanate, isophorone diisocyanate, and hexamethylene diisocyanate. The back layer can contain one or two or more isocyanate compounds.

The back layer can contain at least one selected from the release materials and the additives described above.

The back layer has a thickness of, for example, 0.3 μm or more and 3.0 μm or less.

In an embodiment, the back layer can be formed by dispersing or dissolving the above material in water or an appropriate organic solvent to prepare a coating liquid, applying the coating liquid onto the second substrate, by the known means to form a coating film, and then drying the film.

(Printed Material)

Figure 12:
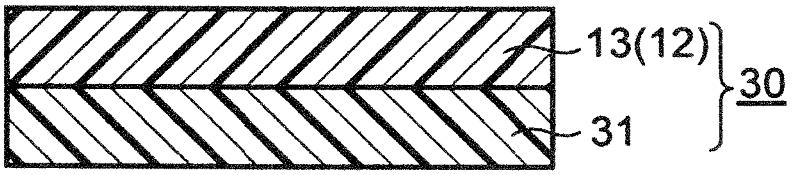
FIG. 12 is a schematic cross-sectional view of an embodiment of a printed material according to of the present disclosure.

As illustrated in FIG. 12, a printed material 30 according to the present disclosure includes a transfer-receiving article 31 and the transfer layer 12 including at least the receiving layer 13, on which an image has been formed, transferred from the intermediate transfer medium 10.

The transfer layer 12 may include the peeling layer and the protective layer as described above (not illustrated in the figure).

The image formed on the receiving layer 13 may be formed of the sublimation dye transferred from the sublimation transfer-type coloring material layer in the thermal transfer sheet, or may be formed of the melt transfer-type coloring material layer transferred from the thermal transfer sheet (not illustrated in the figure).

(Transfer-Receiving Article)

The transfer-receiving article is preferably changed as appropriate according to use. Examples of the transfer-receiving article include paper substrates, such as woodfree paper, art paper, coated paper, natural fiber paper, tracing paper, resin-coated paper, cast coated paper, paper board, synthetic paper, and impregnated paper; card substrates used in the fields of ID cards and IC cards; and substrates formed of glass, metal, ceramic materials, wood, and cloth.

Examples of the card substrates include resin sheets molded from resins, such as poly(vinyl chloride), vinyl chloride-vinyl acetate copolymers, polycarbonates, and polyesters; and metal sheets.

Among those described above, the transfer-receiving article containing a polycarbonate as a main component is preferred, and a card substrate containing a polycarbonate as a main component is more preferred, from the viewpoint that the minimum transferable temperature of the transfer layer included in the intermediate transfer medium can be further reduced.

In the present disclosure, the term "main component" refers to a material that accounts for 50% or more by mass of the transfer-receiving article, such as a card substrate.

The thickness of the transfer-receiving article is preferably hanged as appropriate according to its use and is, for example, 30 μm or more and 900 μm or less.

(Method for Producing Printed Material)

A method for producing a printed material according to the present disclosure is characterized by including the steps of:

providing the intermediate transfer medium described above;

forming an image on the receiving layer included in the intermediate transfer medium; and transferring the transfer layer provided with at least the receiving layer including the image that has been formed, from the intermediate transfer medium onto a transfer-receiving article.

The steps included in the method for producing a printed material according to the present disclosure will be described below.

(Step of Providing Intermediate Transfer Medium)

The method for producing a printed material according to the present disclosure includes the step of providing the intermediate transfer medium. The method for producing the intermediate transfer medium is as described above; thus, the description thereof is omitted here.

(Image Formation Step)

The method for producing a printed material according to the present disclosure includes the step of forming an image on the receiving layer included in the intermediate transfer medium.

The image can be formed using the thermal transfer sheet. In this case, the image can be formed by a conventionally known method with a commercially available thermal transfer printer including a thermal head and a platen roller.

(Transfer Step onto Transfer-Receiving Article)

The method for producing a printed material according to the present disclosure includes the step of transferring the transfer layer provided with at least the receiving layer including the image that has been formed, from the intermediate transfer medium onto the transfer-receiving article. The transfer can be performed by a conventionally known method with, for example, a commercially available thermal transfer printer.

The transfer-receiving article is as described above.

The transfer temperature is preferably 90° C. or higher and 160° C. or lower, more preferably 110° C. or higher and 130° C. or lower. This can suppress the occurrence of warpage in the transfer-receiving article.

The present disclosure relates to, for example, [1] to [15] described below.

[1] An intermediate transfer medium, including a substrate and a transfer layer including at least a receiving layer, in which a logarithmic damping ratio ΔE determined by subjecting the receiving layer to rigid-body pendulum measurement at 70° C. is 0.10 or more.

[2] The intermediate transfer medium described in [1], in which the receiving layer contains a vinyl chloride-vinyl acetate copolymer and a crystalline polyester.

[3] The intermediate transfer medium described in [2], in which the crystalline polyester has a glass transition temperature of −50° C. or higher and 50° C. or lower.

[4] The intermediate transfer medium described in [2] or [3], in which the crystalline polyester has a melting point of 50° C. or higher and 150° C. or lower.

[5] The intermediate transfer medium described in any one of [2] to [4], in which the crystalline polyester has a number-average molecular weight of 10,000 or more and 50,000 or less.

[6] The intermediate transfer medium described in any one of [2] to [5], in which the ratio of the amount of the vinyl chloride-vinyl acetate copolymer contained to the amount of the crystalline polyester contained in the receiving layer (the amount of the vinyl chloride-vinyl acetate copolymer contained/the amount of the crystalline polyester contained) is 1/4 or more and 19/1 or less.

[7] The intermediate transfer medium described in [1], in which the receiving layer contains an amorphous polyester, and the amount of the amorphous polyester contained is 80% or more by mass and 100% or less by mass based on the total amount of a resin material contained in a surface layer of the receiving layer.

[8] The intermediate transfer medium described in [7], in which the amorphous polyester has a glass transition temperature of 30° C. or higher and 80° C. or lower.

[9] The intermediate transfer medium described in [7] or [8], in which the amorphous polyester has a number-average molecular weight of 11,000 or more and 50,000 or less.

[10] The intermediate transfer medium described in any one of [1] to [9], in which the transfer layer has a minimum transferable temperature of 130° C. or lower.

[11] A combination of a thermal transfer sheet including a second substrate and a coloring material layer, and the intermediate transfer medium described in any one of [1] to [10].

[12] A printed material produced using the intermediate transfer medium described in any one of [1] to [10], including a transfer-receiving article and the transfer layer provided with at least the receiving layer including an image that has been formed.

[13] The printed material described in [12], in which the transfer-receiving article contains a polycarbonate as a main component.

[14] A method for producing a printed material, including the steps of providing the intermediate transfer medium described in any one of [1] to [10], forming an image on the receiving layer included in the intermediate transfer medium, and transferring the transfer layer provided with at least the receiving layer including the image that has been formed, from the intermediate transfer medium onto a transfer-receiving article.

[15] The method for producing a printed material described in [14], in which the transfer temperature of the transfer layer onto the transfer-receiving article is 90° C. or higher and 160° C. or lower.

EXAMPLES

While the present disclosure will be described in more detail below with reference to examples, the present disclosure is not limited to these examples.

Example 1

As a substrate, PET having a thickness of 16 μm was provided. Then, a coating liquid, having the following composition, for forming a peeling layer was applied to one surface of the substrate and dried to form a peeling layer having a thickness of 1.6 μm.

| (Coating Liquid for Forming Peeling Layer) | |
|---|---|
| Acrylic resin | 24 parts by mass |
| (Dianal (registered trademark) BR-87, available from Mitsubishi Chemical Corporation) | |
| Vinyl chloride-vinyl acetate copolymer | 6 parts by mass |
| (Solbin (registered trademark) CNL, available from Nissin Chemical Industry Co., Ltd.) | |
| Ultraviolet absorber | 1.5 parts by mass |
| (UVA-40KT, available from BASF Japan Ltd.) | |
| Polyester | 0.3 parts by mass |
| (Vylon (registered trademark) 200, available from Toyobo Co., Ltd.) | |
| Polyethylene wax | 1 part by mass |
| Methyl ethyl ketone (MEK) | 50 parts by mass |
| Toluene | 50 parts by mass |

A coating liquid, having the following composition, for forming a receiving layer was applied onto the peeling layer formed as described above and dried to form a receiving layer having a thickness of 2 μm, thereby producing an intermediate transfer medium.

| (Coating Liquid for Forming Receiving Layer) | |
|---|---|
| Vinyl chloride-vinyl acetate copolymer | 70 parts by mass |
| (Solbin (registered trademark) CNL, Tg: 76° C., Mn: 12,000, available from Nissin Chemical Industry Co., Ltd.) | |
| Crystalline polyester | 30 parts by mass |
| (Vylon (registered trademark) GA-6400, Tg: -20°C, melting point 96° C., Mn: 30,000, available from Toyobo Co., Ltd.) | |
| Modified silicone oil A | 2.5 parts by mass |
| (KF-410, available from Shin-Etsu Silicone Co., Ltd.) | |
| Modified silicone oil B | 2.5 parts by mass |
| (KF-352, available from Shin-Etsu Silicone Co., Ltd.) | |
| MEK | 200 parts by mass |
| Toluene | 200 parts by mass |

Example 2 and Comparative Examples 1 to 3

Intermediate transfer media were produced as in Example 1, except that the resin material compositions of the receiving layers included in the intermediate transfer media were changed as presented in Table 1.

In Comparative examples 2 and 3, an amorphous polyester (Vylon (registered trademark) GK250, Tg: 60° C., Mn: 10,000, available from Toyobo Co., Ltd.) was used in place of the crystalline polyester.

Example 3

An intermediate transfer medium was produced as in Example 1, except that a coating liquid (a), having the following composition, for forming a receiving layer was applied onto the peeling layer and dried to form a receiving layer (a) having a thickness of 1 μm, and then a coating liquid (b), having the following composition, for forming a receiving layer was applied onto the receiving layer (a) and dried to form a receiving layer (b) having a thickness of 1 μm.

| (Coating Liquid (a) for Forming Receiving Layer) | |
|---|---|
| Amorphous polyester | 18 parts by mass |
| (Elitel (registered trademark) UE-3285, Tg: 66° C., Mn: 14,000, available from Unitika Ltd.) | |
| Octrizole | 2 parts by mass |
| (Chisorb 5411, melting point: 106°C to 108° C., molecular weight 323.43, available from Double Bond Chemical Ind. Co., Ltd.) | |
| MEK | 40 parts by mass |
| Toluene | 40 parts by mass |

| (Coating Liquid (b) for Forming Receiving Layer) | |
|---|---|
| Amorphous polyester | 20 parts by mass |
| (Vylon (registered trademark) 822, Tg: 68° C., Mn: 15,000, available from Toyobo Co., Ltd.) | |
| Silica | 0.2 parts by mass |
| (Sylysia (registered trademark) 730, average particle size: 4.0 μm. available from Fuji Silysia Chemical Ltd.) | |
| MEK | 40 parts by mass |
| Toluene | 40 parts by mass |

Example 4

An intermediate transfer medium was produced as in Example 3, except that a coating liquid (c) for forming a receiving layer was used in place of the coating liquid (a) for forming a receiving layer.

| (Coating Liquid (c) for Forming Receiving Layer) | |
|---|---|
| Vinyl chloride-vinyl acetate copolymer | 18 parts by mass |
| Solbin (registered trademark) CNL, Tg: 76° C., Mn: 12,000, available from Nissin Chemical Industry Co., Ltd.) | |
| Octrizole | 2 parts by mass |
| (Chisorb 5411, melting point: 106° C. to 108° C., molecular weight: 323.43, available from Double Bond Chemical Ind. Co., Ltd.) | |
| MEK | 40 parts by mass |
| Toluene | 40 parts by mass |

<<Measurement of Logarithmic Damping Ratio ΔE>>

The intermediate transfer media produced in the above examples and comparative examples were cut into a size of 15 mm wide×50 mm long to provide test samples.

A rigid-body pendulum-type physical properties testing instrument including a test sample temperature control block, a cylindrical cylinder, a pendulum frame, and an oscillation displacement sensor was provided (see FIG. 5). Arrows in the figure are the swing directions of the pendulum frame, and the swing directions are parallel to the length direction of the fixed test sample. The test sample was fixed on the test sample temperature control block with a Kapton tape at a place that did not affect the measurement results in such a manner that the receiving layer faced upward, and a temperature sensor was disposed on the test sample.

The test sample was fixed in such a manner that its length direction was orthogonal to the direction of the central axis of the cylindrical cylinder. The cylindrical cylinder was disposed so as to be in contact with a surface of the receiving layer.

The test sample temperature control block was heated from 25° C. to 130° C. at a rate of temperature increase of 3° C./min, and the logarithmic damping ratio ΔE of the receiving layer at this time was measured. Table 1 presents the measurement results.

Specifically, the logarithmic damping ratio ΔE when the temperature of the receiving layer of the test sample was 70° C. was used. A test sample measured once was no longer used. The measurement was performed three times using different test samples. The average value was used as a logarithmic damping ratio ΔE (ΔE=[In (A1/A2)+In (A2/A3)+ . . . In (An/An+1)]/n, where A: amplitude, n: wave number, and initial amplitude A1: about 0.3 degrees).

As the rigid-body pendulum-type physical properties testing instrument, RPT-3000W available from A & D Company, Limited was used. As the test sample temperature control block, a CHB-100 cooling/heating block was used. As the cylindrical cylinder, an RBP-060 cylindrical cylinder edge was used. As the pendulum frame, FRB-100 was used.

<<Evaluation of Transferability>>

The following were provided: the intermediate transfer media produced in the above examples and comparative examples, thermal transfer sheets produced as described below, cards (85 mm×54 mm) formed of poly(vinyl chloride) as transfer-receiving articles, and a thermal transfer printer (available from ZEBRA, ZXP9) equipped with a thermal head and a platen roller.

In this thermal transfer printer, the sublimation dye contained in the sublimation transfer-type coloring material layer was transferred from the thermal transfer sheet onto the receiving layer of the intermediate transfer medium to form a black solid image (R, G, B=0, 0, 0). After the image formation, the transfer layer including the formed image was transferred from the intermediate transfer medium onto the card formed of the poly(vinyl chloride) to produce a printed material.

The transfer temperature of the transfer layer onto the card formed of the poly(vinyl chloride) was reduced from 160° C. in decrements of 5° C. The minimum transferable temperature at which the transfer region could be 95% or more was determined. The transferability was evaluated according to the following evaluation criteria. Table 1 presents the evaluation results. Table 1 presents the minimum transferable temperature.

The transfer layer was transferred at a transfer rate of 1.1 inches/second.

(Evaluation Criteria)

AA: The minimum transferable temperature was 125° C. or lower.

BB: The minimum transferable temperature was higher than 125° C. and 130° C. or lower.

CC: The minimum transferable temperature was higher than 130° C.

(Production of Thermal Transfer Sheet)

As the second substrate, a PET film having a thickness of 6 μm was provided. Coating liquids A, B and C, having the following compositions, for forming sublimation transfer-type coloring material layers were applied in any order on one surface of the second substrate so as being frame sequentially and dried to form sublimation transfer-type coloring material layers A to C each having a thickness of 0.7 μm.

| <Coating Liquid A for Forming Sublimation Transfer-Type Coloring Material Layer> | |
|---|---|
| Yellow sublimation dye | 6 parts by mass |
| Poly(vinyl acetal) | 4 parts by mass |
| (S-LEC (registered trademark) KS-6, available from Sekisui Chemical Co., Ltd.) | |
| Modified silicone oil C | 0.2 parts by mass |
| (KP-1800U, available from Shin-Etsu Silicone Co., Ltd.) | |
| MEK | 45 parts by mass |
| Toluene | 45 parts by mass |

| <Coating Liquid B for Forming Sublimation Transfer-Type Coloring Material Layer> | |
|---|---|
| Magenta sublimation dye | 6 parts by mass |
| Poly(vinyl acetal) | 4 parts by mass |
| (S-LEC (registered trademark) KS-6, available from Sekisui Chemical Co., Ltd.) | |
| Modified silicone oil C | 0.2 parts by mass |
| (KP-1800U, available from Shin-Etsu Silicone Co., Ltd.) | |
| MEK | 45 parts by mass |
| Toluene | 45 parts by mass |

| <Coating Liquid C for Forming Sublimation Transfer-Type Coloring Material Layer> | |
|---|---|
| Cyan sublimation dye | 6 parts by mass |
| Poly(vinyl acetal) | 4 parts by mass |
| (S-LEC (registered trademark) KS-6, available from Sekisui Chemical Co., Ltd.) | |
| Modified silicone oil C | 0.2 parts by mass |
| (KP-1800U, available from Shin-Etsu Silicone Co., Ltd.) | |
| MEK | 45 parts by mass |
| Toluene | 45 parts by mass |

A coating liquid, having the following composition, for forming a back layer was applied onto the other surface of the second substrate and dried to form a back layer having a thickness of 1 μm, thereby producing a thermal transfer sheet.

| <Coating Liquid for Forming Back Layer> | |
|---|---|
| Poly(vinyl butyral) | 20 parts by mass |
| (S-LEC (registered trademark) BX-1, available from Sekisui Chemical Co., Ltd.) | |
| Polyisocyanate | 44 parts by mass |
| (Burnock (registered trademark) D750, available from DIC Corporation) | |
| Phosphate-based surfactant | 13 parts by mass |
| (Plysurf (registered trademark) A208N, available from Dai-ichi Kogyo Seiyaku Co., Ltd.) | |
| Talc | 3 parts by mass |
| (Micro Ace (registered trademark) P-3, available from Nippon Talc Co., Ltd.) | |
| MEK | 460 parts by mass |
| Toluene | 460 parts by mass |

<<Evaluation of Releasability>>

The following were provided: the intermediate transfer media produced in the above examples and comparative examples, thermal transfer sheets described above, cards, serving as a transfer-receiving article, formed of polycarbonate, and a thermal transfer printer (available from ZEBRA, ZXP9) equipped with a thermal head and a platen roller.

In this thermal transfer printer, the sublimation dye contained in the sublimation transfer-type coloring material layer was transferred from the thermal transfer sheet onto the receiving layer of the intermediate transfer medium to form a black solid image (R, G, B=0, 0, 0). After the image formation, the transfer layer including the formed image was transferred from the intermediate transfer medium onto the card formed of the polycarbonate to produce a printed material.

The transfer layer was transferred at a temperature of 155° C. and a transfer rate of 1.1 inches/second.

The resulting printed materials were visually checked and evaluated in accordance with the following evaluation criteria. Table 1 presents the evaluation results.

The case where the receiving layer and the thermal transfer sheet were fused, the thermal transfer sheet was broken, or the printer was stopped was evaluated as NG.

(Evaluation Criteria)

AA: High releasability was provided, and a uniform black solid image printed material was obtained.

BB: A print peeling sound was generated when a black solid image was formed, but a uniform black solid image printed material was obtained.

CC: Abnormal transfer occurred in which the sublimation transfer-type coloring material layer was partially transferred to the receiving layer along with the resin material when a black solid image was formed.

<<Evaluation of Print Density>>

The image density of the printed material obtained in the above-mentioned evaluation of releasability was measured with a spectroscopic reflection densitometer (i1, available from X-rite) under the following conditions. Table 1 presents these results.

Spectral sensitivity: ISO-5/3 ISO Visual Density

Measurement illumination condition: M0 (ISO 13655-2009)

It should be understood by those skilled in the art that the intermediate transfer medium and the like according to the present disclosure are not limited by the description of the above examples, but the above examples and specification are merely for illustrating the principle of the present disclosure, and various modifications or improvements can be made without departing from the spirit and scope of the present disclosure, and all of these modifications or improvements fall within the scope sought to be protected by the present disclosure. Furthermore, the scope of protection claimed by the present disclosure includes not only the description of the claims but also the equivalents thereof.

| Reference Signs List | |
|---|---|
| 10 | intermediate transfer medium |
| 11 | substrate |
| 12 | transfer layer |
| 13 | receiving layer |
| 14 | peeling layer |
| 15 | protective layer |
| 20 | thermal transfer sheet |
| 21 | second substrate |
| 22 | sublimation transfer-type coloring material layer |
| 23 | melt transfer-type coloring material layer |
| 24 | peeling layer |
| 25 | release layer |
| 26 | back layer |
| 30 | printed material |
| 31 | transfer-receiving article |
| A | rigid-body pendulum-type physical properties testing instrument |
| B | test sample temperature control block |
| C | cylindrical cylinder |
| D | pendulum frame |
| E | oscillation displacement sensor |

The invention claimed is:

1. An intermediate transfer medium, comprising a substrate and a transfer layer including at least a receiving layer, wherein the receiving layer contains a vinyl chloride-vinyl acetate copolymer and a crystalline polyester, and wherein a logarithmic damping ratio ΔE determined by subjecting the receiving layer to rigid-body pendulum measurement at 70° ° C. is 0.14 or more.

TABLE 1

| | | Example 1 | Example 2 | Comparative example 1 | Comparative example 2 | Comparative example 3 | Example 3 | Example 4 |
|---|---|---|---|---|---|---|---|---|
| Composition of resin material in receiving layer (*1, 2) | Vinyl chloride-vinyl acetate copolymer content (% by mass) | 70 | 50 | 100 | 70 | 25 | 0 | 0 |
| | Crystalline polyester content (% by mass) | 30 | 50 | 0 | 0 | 0 | 0 | 0 |
| | Amorphous polyester content (% by mass) | 0 | 0 | 0 | 30 | 75 | 100 | 100 |
| Evaluation | Logarithmic damping ratio ΔE | 0.18 | 0.2 | 0.05 | 0.09 | 0.09 | 0.11 | 0.12 |
| | Evaluation of transferability | AA | AA | CC | CC | BB | AA | AA |
| | Minimum transferable temperature (° C.) | 120 | 110 | 140 | 135 | 130 | 115 | 115 |
| | Evaluation of releasability | AA | BB | AA | CC | CC | AA | AA |
| | Print density | 2.19 | 2.26 | 2.05 | 2.1 | 2.12 | 2.15 | 2.18 |

*1: Values were described with respect to the total resin material content of the receiving layer.

*2: In each of Examples 3 and 4, the composition of the resin material in the outermost layer of the receiving layer was described.

2. The intermediate transfer medium according to claim 1, wherein the crystalline polyester has a glass transition temperature in a range of −50° ° C. or higher to 50° C. or lower.

3. The intermediate transfer medium according to claim 1, wherein the crystalline polyester has a melting point in a range of 50° C. or higher to 150° C. or lower.

4. The intermediate transfer medium according to claim 1, wherein the crystalline polyester has a number-average molecular weight in a range of 10,000 or more to 50,000 or less.

5. The intermediate transfer medium according to claim 1, wherein a ratio of an amount of the vinyl chloride-vinyl acetate copolymer contained to an amount of the crystalline polyester contained in the receiving layer (the amount of the vinyl chloride-vinyl acetate copolymer contained/the amount of the crystalline polyester contained) is in a range of 1/4 or more to 19/1 or less.

6. The intermediate transfer medium according to claim 1, wherein the transfer layer has a minimum transferable temperature of 130° ° C. or lower.

7. A combination of a thermal transfer sheet including a second substrate and a coloring material layer, and the intermediate transfer medium according to claim 1.

8. A printed material comprising:

a transfer-receiving article; and a transfer layer provided with at least a receiving layer including an image that has been formed, which is transferred from the intermediate transfer medium according to the claim 1.

9. The printed material according to claim 8, wherein the transfer-receiving article contains a polycarbonate as a main component.

10. A method for producing a printed material, comprising the steps of:

providing the intermediate transfer medium according to claim 1;

forming an image on the receiving layer included in the intermediate transfer medium; and transferring the transfer layer provided with at least the receiving layer including the image that has been formed, from the intermediate transfer medium onto a transfer-receiving article.

11. The method for producing a printed material according to claim 10, wherein a transfer temperature of the transfer layer onto the transfer-receiving article is in a range of 90° C. or higher to 160° C. or lower.

* * * * *